(12) United States Patent
Berenberg et al.

(10) Patent No.: US 9,215,608 B2
(45) Date of Patent: Dec. 15, 2015

(54) PROXIMITY OUT-OF-BAND MOBILE DEVICE TO DEVICE COMMUNICATION BY MEANS OF LOW-POWER MESH NETWORKS

(71) Applicant: Cubic Corporation, San Diego, CA (US)

(72) Inventors: Paul Berenberg, Los Altos, CA (US); Anatoli Gostev, Cupertino, CA (US); Igor Ryshakov, Mountain View, CA (US)

(73) Assignee: CUBIC CORPORATION, San Diego, CA (US)

( * ) Notice: Subject to any disclaimer, the term of this patent is extended or adjusted under 35 U.S.C. 154(b) by 0 days.

(21) Appl. No.: 14/256,871

(22) Filed: Apr. 18, 2014

(65) Prior Publication Data

US 2014/0313883 A1 Oct. 23, 2014

Related U.S. Application Data

(60) Provisional application No. 61/814,095, filed on Apr. 19, 2013.

(51) Int. Cl.
| | |
|---|---|
| *H04W 4/00* | (2009.01) |
| *H04W 24/04* | (2009.01) |
| *H04W 40/14* | (2009.01) |
| *H04W 40/10* | (2009.01) |
| *H04W 76/02* | (2009.01) |
| *H04W 40/04* | (2009.01) |
| *H04W 84/18* | (2009.01) |
| *H04L 29/14* | (2006.01) |

(52) U.S. Cl.
CPC .............. *H04W 24/04* (2013.01); *H04W 40/10* (2013.01); *H04W 40/14* (2013.01); *H04W 76/023* (2013.01); *H04L 69/40* (2013.01); *H04W 40/04* (2013.01); *H04W 84/18* (2013.01)

(58) Field of Classification Search
None
See application file for complete search history.

(56) References Cited

U.S. PATENT DOCUMENTS

| 8,023,426 B2* | 9/2011 | Liu et al. ..................... 370/252 |
|---|---|---|
| 2003/0202468 A1* | 10/2003 | Cain et al. ..................... 370/229 |

(Continued)

FOREIGN PATENT DOCUMENTS

| CA | 2373072 A1 | 11/2000 |

OTHER PUBLICATIONS

International Search Report and Written Opinion from PCT/US2014/034719 mail on Jul. 1, 2014, 13 pages.

(Continued)

*Primary Examiner* — Bob Phunkulh
(74) *Attorney, Agent, or Firm* — Kilpatrick Townsend & Stockton LLP (57) ABSTRACT

Methods of telecommunicating and systems configured to perform the methods are disclosed. In some embodiments, the methods include establishing a primary communications link, determining that a backup communications link is to be established, and determining a plurality of candidate network nodes. The method also includes selecting one of the candidate network nodes with which to establish the backup communications link, where the selected candidate network node is selected based at least in part on the selected candidate network node being in a foreign network, establishing the backup communications link with a selected candidate network node, and communicating using the backup communications link.

20 Claims, 8 Drawing Sheets

(56) References Cited

U.S. PATENT DOCUMENTS

| | | | |
|---|---|---|---|
| 2005/0073958 A1* | 4/2005 | Atlas et al. | 370/238 |
| 2007/0258508 A1* | 11/2007 | Werb et al. | 375/140 |
| 2008/0192713 A1* | 8/2008 | Mighani et al. | 370/338 |
| 2010/0091669 A1* | 4/2010 | Liu et al. | 370/252 |
| 2012/0275361 A1 | 11/2012 | Berenberg et al. | |
| 2013/0279409 A1* | 10/2013 | Dublin et al. | 370/328 |
| 2013/0279410 A1* | 10/2013 | Dublin et al. | 370/328 |

OTHER PUBLICATIONS

Bellavista, Paolo, et al., "Differentiated management Stategies for Multi-Hop Multi-Path Heterongeneous Connectivity ini Mobile Environments", IEEE Transactions on Network and Service Management, vol. 8, No. 3, Sep. 2011, pp. 190-204.

Vodel, Matthias, et al., "Performance Analysis of Radio Standard Spanning Communication in Mobile Ad Hoc Networks", 2007 International Symposium on Communications and Information Technologies, 2007 (ISCIT 2007), pp. 848-853.

Ghosh, Rajib, et al., "Symmetrical Routes and Reverse Path Congestion Control", Internet Citation, Sep. 11, 1997, URL:http://citeseer.ist.psu.edu/rd/80986126%2C1%C0.25%2CDownload/http://citeseer.ist.psu.edu/cache/papers/cs/310/http:zSzzSzwww.cs.wustl.eduzSzcszSztechreportszSz1997zSzwucs-97-37.pdf/ghosh97symmetrical.pdf;pp. 1-17.

Shillingford, Nadine, et al., "A Framework for Route Configurability in Power-Constrained Wireless Mesh Networks", Ad Hoc Networks, vol. 8, No. 8, Nov. 1, 2010, pp. 857-871.

\* cited by examiner

PROXIMITY OUT-OF-BAND MOBILE DEVICE TO DEVICE COMMUNICATION BY MEANS OF LOW-POWER MESH NETWORKS

REFERENCES TO RELATED APPLICATIONS

This application claims benefit under 35 USC 119 (e) of U.S. provisional Application No. 61/814,095, filed on Apr. 19, 2013, the contents of all of which are incorporated herein by reference in their entirety.

STATEMENT AS TO RIGHTS TO INVENTIONS MADE UNDER FEDERALLY SPONSORED RESEARCH AND DEVELOPMENT

The U.S. Government may have rights in this invention pursuant to Contract No. 1406-04-06-CT-60916.

FIELD OF THE INVENTION

The present invention relates, generally, to telecommunications and, more particularly, to systems and methods of telecommunicating with mesh networks.

BACKGROUND OF THE INVENTION

Modern networks can comprise a variety of devices, which may be connected in a variety of ways. A network can be, for example, centralized or ad hoc. In the latter case, each networked device, or node, can act as a router to forward data from other nodes, in addition to communicating its own data.

Such wireless networks, however, have their limitations. For example, wireless devices powered by batteries may require frequent battery changes due to the high power cost of wireless data transmission. Because established links within a network may become unavailable or undesirable, for example, due to failures, maintenance, or lack of coverage, systems and methods for establishing alternative links are beneficial.

SUMMARY OF THE INVENTION

One inventive aspect is a method of telecommunicating. The method includes establishing a primary communications link, determining that a backup communications link is to be established, and determining a plurality of candidate network nodes. The method also includes selecting one of the candidate network nodes with which to establish the backup communications link, where the selected candidate network node is selected based at least in part on the selected candidate network node being in a foreign network, establishing the backup communications link with a selected candidate network node, and communicating using the backup communications link.

Another inventive aspect is a telecommunications device. The telecommunications device includes an interface configured to communicatively couple with other telecommunications devices, a memory, configured to store instructions, and a processor, configured to execute the stored instructions so as to cause the telecommunications device to perform a method. The method includes establishing a primary communications link, determining that a backup communications link is to be established, and determining a plurality of candidate network nodes. The method also includes selecting one of the candidate network nodes with which to establish the backup communications link, where the selected candidate network node is selected based at least in part on the selected candidate network node being in a foreign network, establishing the backup communications link with a selected candidate network node, and communicating using the backup communications link.

BRIEF DESCRIPTION OF THE DRAWINGS

The accompanying drawings, which are incorporated in and constitute a part of this specification, illustrate implementations of inventive concepts and, together with the description, serve to explain various advantages and principles of the invention.

DETAILED DESCRIPTION OF THE INVENTION

For the purposes of explanation, the ensuing details are set forth in order to provide a thorough understanding of various embodiments. It will be apparent, however, to one skilled in the art that various embodiments may be practiced without some of these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments. In other instances, well-known structures and devices are shown in block diagram form.

Embodiments provided herein are examples only, and are will not intended to limit the scope, applicability, or configuration of the disclosure. Rather, the ensuing description of the embodiments will provide those skilled in the art with an enabling description for implementing one or more embodiments. It should be understood that various changes may be made in the function and arrangement of elements without departing from the spirit and scope of the disclosed systems and methods as set forth in the appended claims.

Also, individual embodiments may, for example, be described as one or more processes which are depicted as flowcharts, flow diagrams, data flow diagrams, structured diagrams, or block diagrams. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Wireless networks and wireless network devices described herein may be configured in a variety of ways, in a variety of contexts. Example configurations include mesh, point-to-point, and/or ad hoc networks, among others. The flexible nature of these networks—enabling network devices, or nodes, to join and leave these networks dynamically—enables these networks to provide end-to-end security and management of transportation and/or logistical systems. Although disclosed embodiments focus on wireless technologies, the techniques described herein can be applied to wired communication networks, such as an ad-hoc serial interface network.

For example, a wireless network can comprise a plurality of nodes communicatively coupled with one another. Furthermore, nodes can act as routers to relay information from other nodes that are not in direct communication with the networks gateway device.

Low-power wireless networks can be advantageous in transportation, logistical, and similar applications where network devices are mobile devices operating on battery power. Although many battery-operated mobile devices utilize wireless technologies, most mobile devices exhaust their batteries in a matter of hours or days.

Embodiments of the present invention are directed toward low-power wireless communication. For example, a telecommunications device may conventionally communicate with a direct communications link with a network gateway for communicating with devices outside the network. According to some embodiments of the present invention, the telecommunications device may alternatively establish a communications link with another device configured to communicate with the gateway. The alternative communications link may be preferable to the direct communications link with the gateway. For example, the alternative communications link may require less power than the direct communication link, or the alternative communications link may be otherwise less costly than the direct communication link.

For example, a mobile device may be connected to a gateway/provider through a mesh network. The mobile device may additionally select a backup communications link, for use should a primary communications link fail. When establishing the backup communications link, the mobile device may choose from among multiple available links. In some embodiments, the mobile device preferentially chooses a link to an alternative or foreign network/provider. This may be beneficial, for example, if the failure of the primary communications link is related to a failure of the home network/provider.

Figure 1:
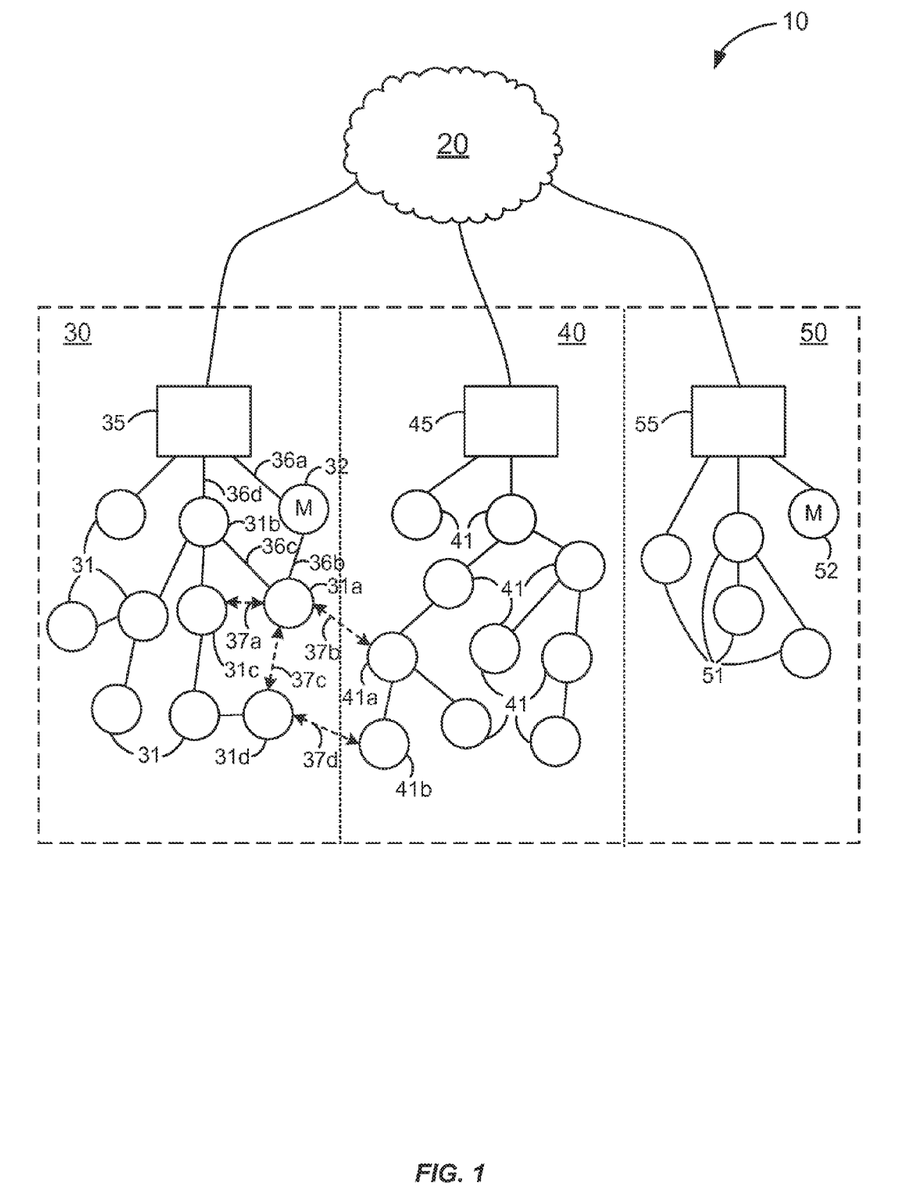
FIG. 1 is a schematic diagram of a telecommunications system.

FIG. 1 is a schematic diagram of a telecommunications system 10. In this example, the communications system 10 includes networks 30, 40, and 50 which are each configured to communicate with network 20. Network 20 transmits data between networks 30, 40, and 50. Networks 30, 40, and 50 respectively include gateways 35, 45, and 55, which are respectively configured to interface between network 20 and networks 30, 40, and 50. Networks 30, 40, and 50 also respectively include a plurality of network nodes 31, 41, and 51. In this embodiment, network nodes 31, 41, and 51 are respectively linked to form mesh networks 30, 40, and 50.

In the example of FIG. 1, network 30 includes mobile node 32, and network 50 includes mobile node 52. Mobile node 32 may be configured to communicate with mobile node 52 through gateway 35, network 20, and gateway 55. For example, mobile nodes 32 and 52 may be cell phones, gateways 35 and 55 may be base stations, and network 20 may be one or more cellular networks.

For mobile node 32 to communicate with gateway 35, a direct communications link 36a may be established between gateway 35 and mobile node 32. For various reasons, such as an unavailability or undesirability of the direct communications link 36a, an alternative communication path may be desirable. For example, one or more of the quality, the cost, and the power required for the direct communications link 36a may be or become unacceptable. For example, a battery of the mobile node 32 may come to have less than a predetermined minimum amount of energy stored therein, such that high-power communication via the direct communications link 36a may be undesirable. Other circumstances may alternatively or additionally cause an alternative communication path to be or become preferable to the direct communications link 36a.

Because each of the network nodes 31 of network 30 are either directly or indirectly communicatively linked with gateway 35, as an alternative to using the direct high-power communications link 36a, mobile node 32 may establish an alternative link with one or more of the network nodes 31. For example, referring to FIG. 1, mobile node 32 may establish a low-power communications link 36b with network node 31a.

As shown in FIG. 1, network node 31a is communicatively linked with network node 31b via communications link 36c, and network node 31b is communicatively linked with gateway 35 via communications link 36d. Accordingly, instead of communicating with gateway 35 through the high-power direct communications link 36a, once low-power communications link 36b is established with network node 31a, mobile node 32 may communicate with gateway 35 via network nodes 31a and 31b using much less power.

Communications link 36c between network nodes 31a and 31b, and communications link between network node 31b and gateway 35 may be established using known techniques. For example, a flooding algorithm may be used with a time to live (TTL) or hop limit. Using such a technique, packets sent between mobile node 32 and gateway 35 are sent to all adjacent nodes, and each adjacent node forwards the packet to all nodes adjacent thereto. Packets received a second time at each node are not forwarded, and packets exceeding the hop limit are also not forward. Using such an algorithm, sent packets are delivered to the correct destination via multiple paths. In some embodiments, each packet may include a routing history, such that a preferred route may be selected for future packets between source and destination.

Additionally or alternatively, network nodes 31 may include a packet routing history which includes a table of sources of packets received from neighboring nodes. Based on the information that a packet originating from a source has been received from a particular neighboring node, a received packet destined for that source may be delivered to the particular neighboring node.

Communications links of communications networks, such as networks 30, 40, and 50, are known to be dynamic, and at times, unreliable. For example, links to network nodes 31 which are mobile devices, disappear if the mobile device is turned off or leaves the network. Accordingly, to maintain reliability of the network, the network nodes maybe configured to establish backup communications links. In some embodiments, the backup communications links are established in response to the failure of a primary link. In some embodiments, the backup communications links are established so as to be prepared for a failure of a primary link in the future.

To establish a backup link, a network node determines candidate network nodes with which a backup link may be established. For example, a network node may determine all neighboring network nodes with which the network node may communicate. For example, the networking node may continuously try to establish links. Even if it uses a maximum number of links, it may continue the process for self-optimization. In some embodiments, at each opportunity, the network node may evaluate the new potential node as a potential backup node. The neighboring nodes send their updates periodically through the established links. Based on that information, backup links can be established or dropped. In some embodiments, one or more network nodes of a foreign network may be included as neighboring network nodes with which the network node establishing a backup link may communicate.

Once candidate network nodes are determined, one or more of the candidate nodes are selected based on selection criteria. Selection criteria may include, for example, one or more factors including cost, power, speed, and reliability. In some embodiments, the selection criteria includes mathematically weighted factors.

In some circumstances, the need for use of a backup link because of an unavailability or undesirability of a primary link may be understood as an indication that all links in the network of the primary link are susceptible to becoming unavailable or undesirable. Accordingly, in some embodiments, candidate nodes of other networks are preferred. In such embodiments, the selection criteria includes a preference toward candidate nodes of foreign networks. In some embodiments, all candidate nodes of foreign networks are preferred over all candidate nodes of the network of the network node establishing a backup communications link. In some embodiments, the selection criteria highly weights foreign network authority as compared to other selection criteria factors.

For example, referring to FIG. 1, network node 31a may be configured to establish a backup communications link. For example, the backup communications link may be established in response to primary communications link 36c being established with network node 31b.

To determine candidate nodes, network node 31a determines neighboring network nodes with which network node 31a may communicate. In the example of FIG. 1, network node 31a determines that it may communicate with network nodes 31b, 31c, 31d, 41a, and 32. Because network node 32 is the source/destination of the communication path for which the backup link is to be established, communications link 36b is excluded as a candidate node for establishing the backup link. In addition, because network node 31a communicates with network node 31b via primary link 36c, network node 31b is also excluded as a candidate node for establishing the backup link. Accordingly, network node 31 determines that network nodes 31c and 31d, and foreign network node 41a are candidates for establishing the backup communications link.

Based on selection criteria, network node 31a selects one of candidate network nodes 31c, 31d, and 41a for establishment of a backup communications link. In order to make the selection, network node 31 considers information for each of the nodes as related to each of the criteria. For example, network node 31 may consider cost, power, speed, and network membership. The network node 31 may use a selection algorithm, such as those discussed elsewhere herein.

Network node 31 receives information related to candidate network nodes, for example, as a result of interactive communication from the candidate network nodes or other network nodes.

In the example of FIG. 1, candidate node 31c, connected by link 37a, may be preferred over candidate node 31d, connected by link 37c, because of its lower cost and higher speed resulting from its proximity to Gateway 35. In addition, regardless of other criteria, network node 41a may be preferred over candidate nodes 31c and 31d as a result of its membership in a foreign network.

Alternatively, if candidate node 31d has or is able to establish communications link 37d with network node 41b, candidate node 31d may be preferred over candidate node 31c because of its communications link 37d with network node 41b of a foreign network. In this circumstance, because both candidate nodes 31d and 41a are respectively connected with nodes of foreign networks by links 37d and 37b, other factors, such as power, cost, and speed may be used for selection between candidate nodes 31d and 41a.

In some embodiments, prior to selection of one of the candidate nodes, costs associated with each candidate node are randomly or pseudo-randomly assigned. As a result, selection criteria related to cost will indicate preference toward one of the candidate nodes randomly. This technique will result in candidate nodes from foreign networks being randomly selected, resulting in improved system stability or reliability.

In some embodiments, selection of one of the candidate nodes is performed randomly or pseudo-randomly. This technique will also result in candidate nodes from foreign networks being randomly selected, resulting in improved system reliability.

Once a candidate node has been selected for backup link establishment, a backup communications link is established between network node 31a and the selected candidate node.

Once the backup communications link has been established, if needed, the backup communications link may be used as a secondary link in a communication path to enable mobile node 32 to communicate with mobile node 52. The backup communications link may be established using conventional techniques.

Other embodiments are also possible. For example, a backup communications link may be established between mobile node 32 and a foreign network node 41. Alternatively or additionally, a backup communications link may be established between a network node 31 and 4 and gateway 45 of the foreign network 40.

Figure 2:
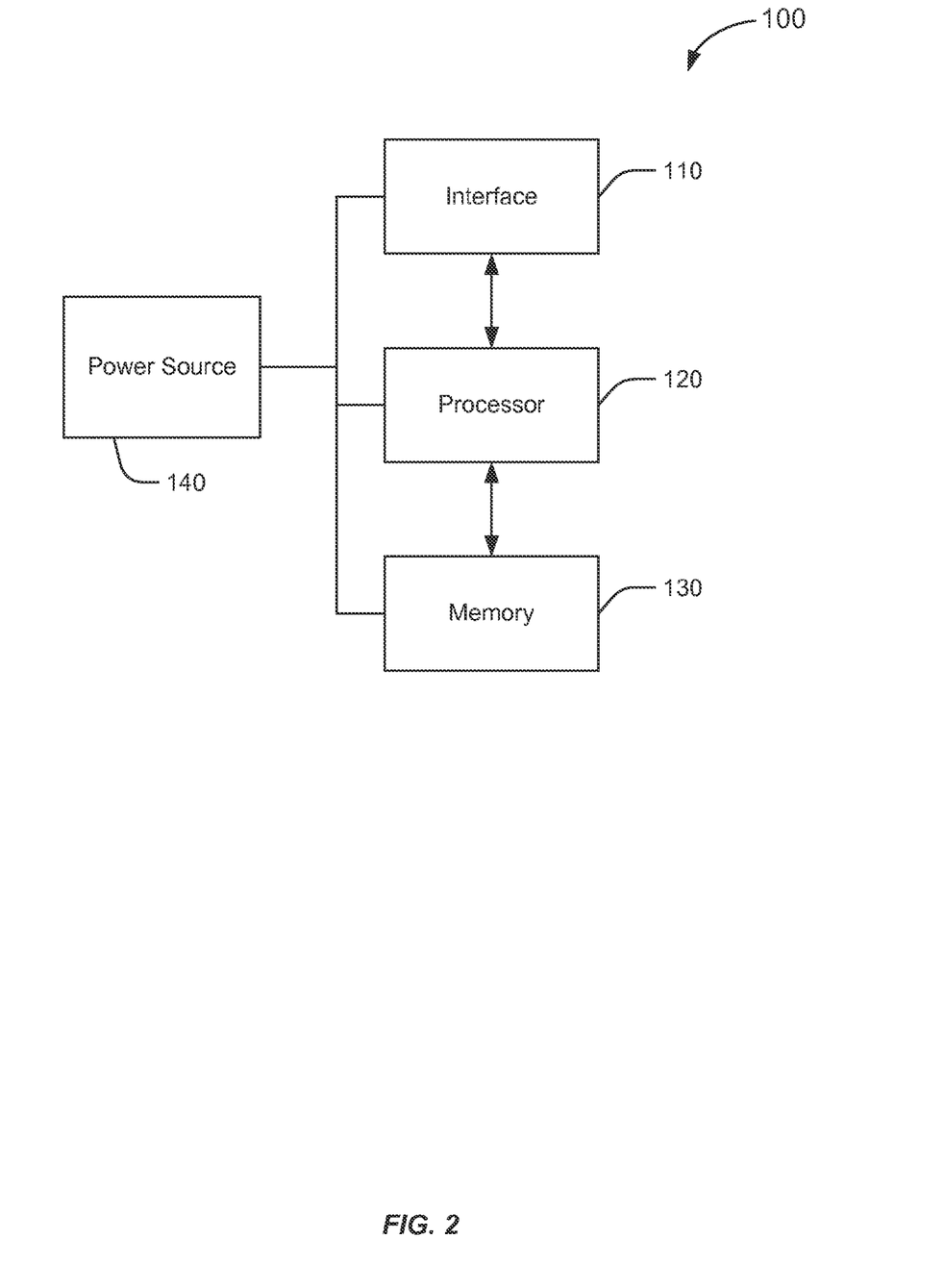
FIG. 2 is a block diagram of a communications device 100.

FIG. 2 is a block diagram of a communications device 100, and includes interface 110, processor 120, memory 130, and power source 140. In some embodiments, communications device 100 includes other components conventionally found in radios. Device 100 may be wired to one or more other communications devices to form a network. Device 100 may additionally or alternatively be wirelessly coupled to one or more other devices to form a communications network. Device 100 may, for example, function as a network node 31, 41, or 51 in any of networks 30, 40, and 50 of FIG. 1.

Interface 110 includes hardware which is configured to communicatively couple with one or more other devices. For example, in some embodiments interface 110 includes one or more antennas connected to one or more transmitters and receivers.

Processor 120 includes hardware which is configured to receive data from interface 110, and to process the received data according to instructions stored in memory 130. Processor 120 also includes hardware which is configured to generate and provide data to interface 110 according to instructions stored in memory 130.

Memory 130 is configured to store instructions for processor 120. In some embodiments, memory 130 is also configured to store data related to the operation of communications device 100.

Power source 140 provides power to each of interface 110, processor 120, and memory 130. Power source 140 includes a portable power source, such as a battery. Additionally or alternatively, power source 140 may include a connection to a fixed power source, such as a power grid. In some embodiments, power source 140 includes hardware configured to communicate a status of power source 140 to processor 120. For example, a power source 140 may be configured to communicate a remaining charge status of the battery to processor 120. Other conventional grid and battery status parameters may additionally or alternatively be communicated to processor 120.

Interface 110, processor 120, memory 130, and power source 140 may be collectively configured to cooperatively perform the methods, processes, and functions described elsewhere herein.

Figure 3:
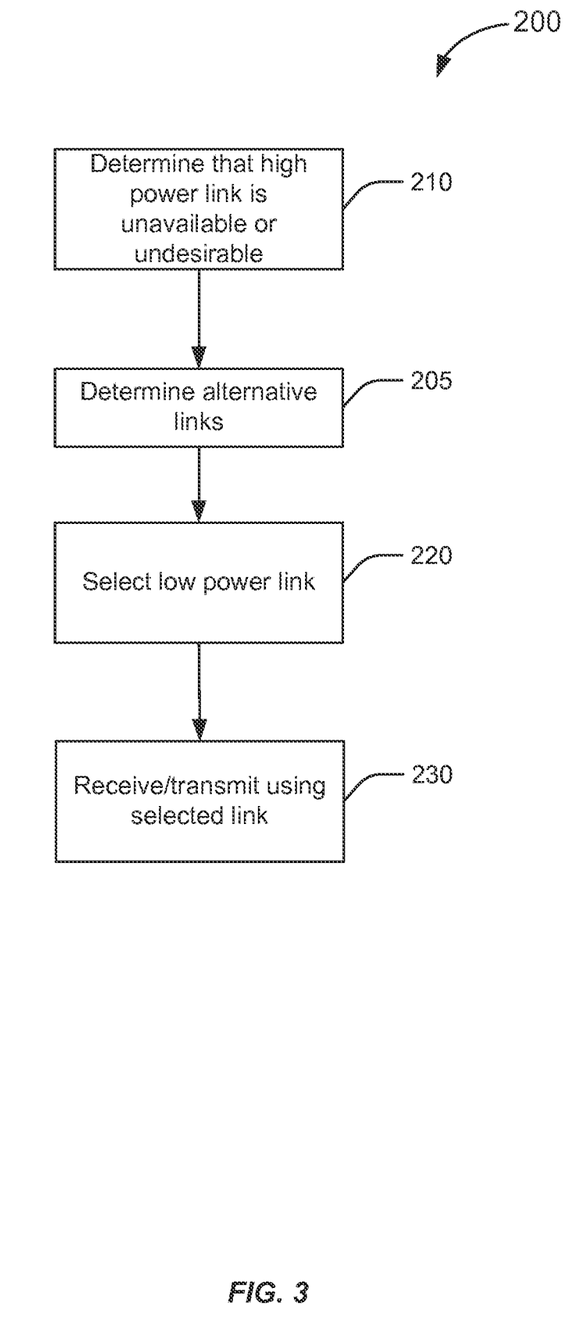
FIG. 3 is a flowchart of a method 200 of selecting a communications link.

FIG. 3 is a flowchart of a method 200 of selecting a communications link. The method may be performed by a communications device, such as communications device 100 of FIG. 2. The communications device may be programmed, for example, to select a primary communications link based on selection criteria using factors, such as speed, cost, and power. In some embodiments, the communications device is programmed to select the primary communications link automatically. In some embodiments, the communications device is programmed to select the primary communications link in response to an indication of an instruction from a user.

At 210, the communications device determines that a high-powered communications link is either unavailable or undesirable.

The determination may be made as part of a process of joining a network. Alternatively, the determination may be made in response to a change occurring after having communicated within a network. For example, as part of the process of joining the network, or in response to the change, the communications device may determine that the high-powered communications link is unavailable or undesirable.

At 205, the communications device determines that multiple alternative communications links are available. The communications device may further determine that at least one of the available links requires more power than one or more of the other available links.

For example, the communications device may determine that high power communications links with a satellite or cell phone network are available, and that low-power communications links with other communications devices, such as cell phones, sensors, and repeaters are additionally available. Based on the selection criteria, the communications device may determine that the high-powered communications link is undesirable, or that a low-power communications link is more preferred.

As another example, after having communicated using a high-powered communications link, the communications device may determine that the high-powered communications link has failed or is otherwise unavailable, or may determine, based on a charge state of a battery, that using the high-powered communications link is no longer desirable. Based on the selection criteria, the communications device may determine that a low-power communications link is more preferred.

At 220, the communications device selects a low-power communications link. For example, based on the selection criteria, communications device may select one of the available low-power communications links. The low-power communications link may be established using conventional techniques.

At 230, once the low-power communications link is established, the communications device receives and transmits information using the established link.

Figure 4:
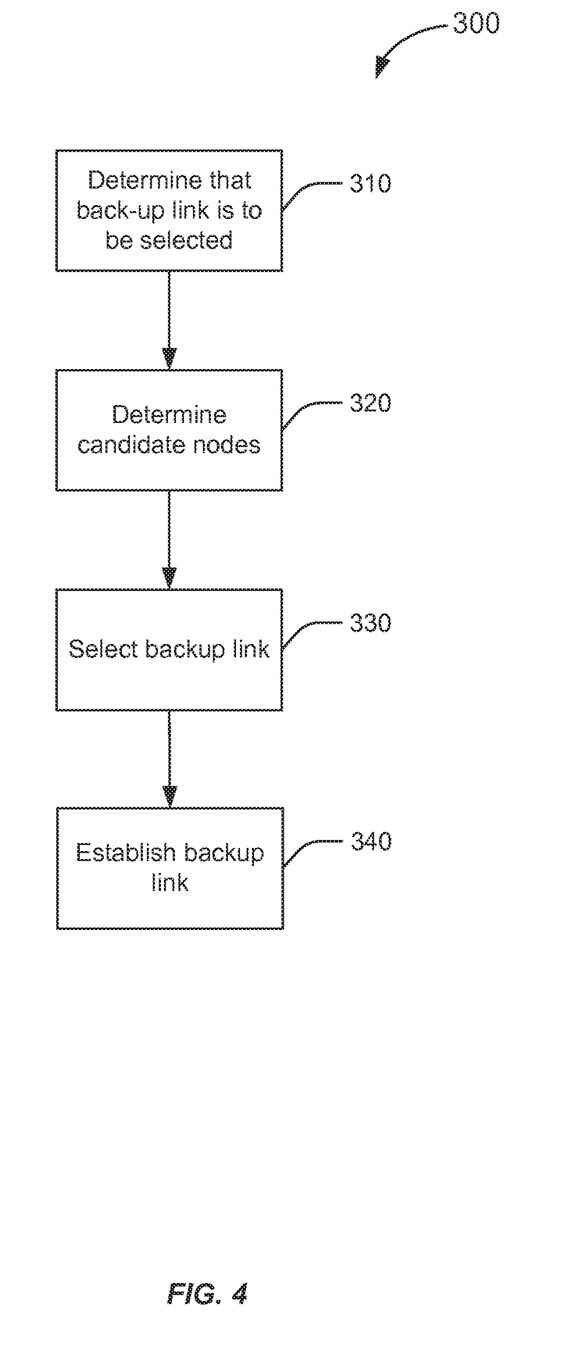
FIG. 4 is a flowchart of a method 300 of selecting a backup communications link.

FIG. 4 is a flowchart of a method 300 of selecting a backup communications link. The method may be performed by a communications device, such as communications device 100 of FIG. 2. The communications device may be programmed, for example, to select a backup communications link based on selection criteria using factors, such as speed, cost, power, and network membership. In some embodiments, the communications device is programmed to select the backup communications link automatically. In some embodiments, the communications device is programmed to select the backup communications link in response to an indication of an instruction from a user.

At 310, the communications device determines that a backup communications link is to be selected.

The determination may be made as part of a process of joining a network, or establishing a primary communications link in a network. Alternatively, the determination may be made in response to a change occurring after having communicated within a network.

At 320, the communications device determines that multiple candidate communications links are available.

For example, the communications device may determine all neighboring network nodes with which the network node may communicate. In some embodiments, one or more network nodes of another network may be included as neighboring network nodes with which the communications device may communicate.

Once candidate network nodes are determined, at 330, one or more of the candidate nodes are selected for backup link establishment based on selection criteria. The selection criteria may include, for example, one or more factors including cost, power, speed, reliability, and network membership. In some embodiments, the selection criteria includes mathematically weighted factors.

As discussed above, in some embodiments, candidate nodes of other networks are preferred. In such embodiments, the selection criteria preferably select candidate nodes of foreign networks. In some embodiments, all candidate nodes of foreign networks are preferred over all candidate nodes of the network of the network node establishing a backup. In some embodiments, the selection criteria highly weights foreign network authority as compared to other selection criteria factors.

In some embodiments, prior to selection of one of the candidate nodes, costs associated with each candidate node are randomly or pseudo-randomly assigned. As a result, selection criteria related to cost will indicate preference toward one of the candidate nodes randomly. This technique will result in candidate nodes from foreign networks being randomly selected, resulting in improved system stability or reliability.

In some embodiments, selection of one of the candidate nodes is performed randomly or pseudo-randomly. This technique will also result in candidate nodes from foreign networks being randomly selected, resulting in improved system reliability.

Once a candidate node has been selected for backup link establishment, at 340, a backup communications link is established between the communications device and the selected candidate node. The backup communications link may be established using conventional techniques. Once the backup communications link has been established, if needed, the backup communications link may be used as a secondary or backup link in the communication path.

Figure 5:
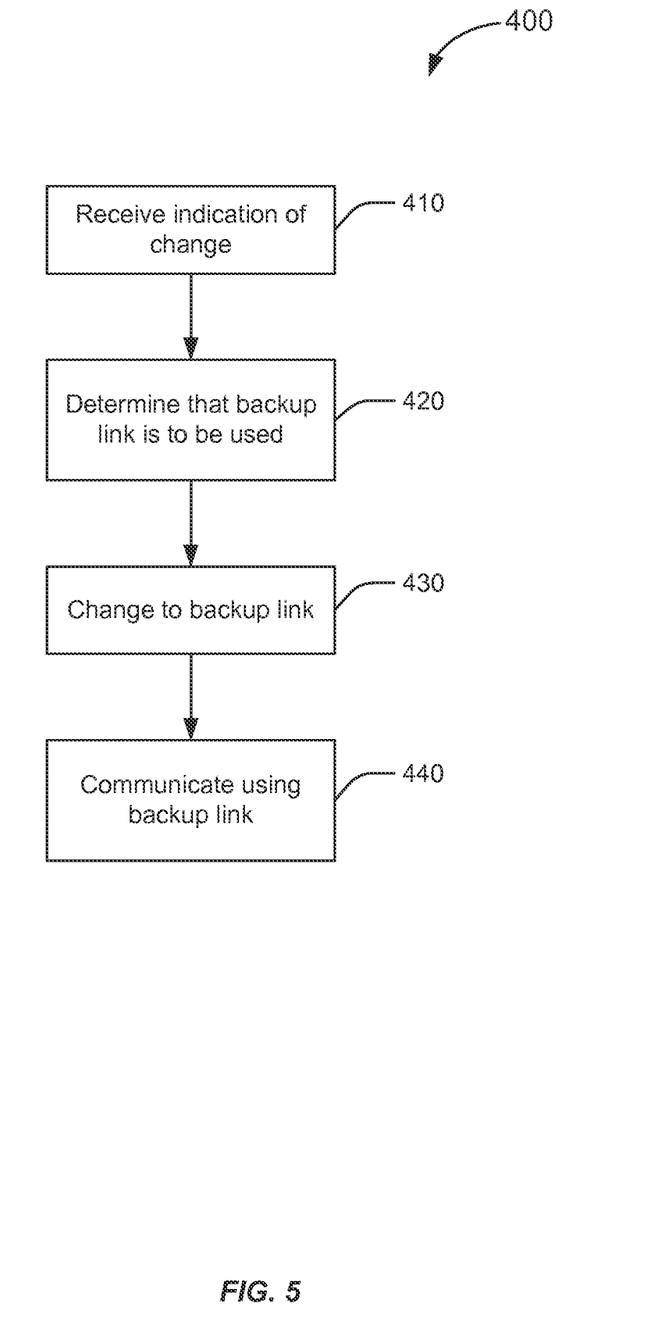
FIG. 5 is a flowchart of a method 400 of using a backup communications link.

FIG. 5 is a flowchart of a method 400 of using a backup communications link. The method may be performed by a communications device, such as communications device 100 of FIG. 2. The communications device may be programmed, for example, to use a backup communications link. In some embodiments, the communications device is programmed to use the backup communications link automatically. In some embodiments, the communications device is programmed to use the backup communications link in response to an indication of an instruction from a user.

At 410, the communications device receives an indication of a change occurring after having communicated with or at least having established a primary communications link within a network. For example, the communications device may receive an indication that the established primary link has, may, or will fail, disappear, or have a change of status, such as a change of one or more factors including cost, power, speed, reliability, and network membership.

In some embodiments, as a result of the change, the communications device is configured to select a backup link using a method, such as that of FIG. 4.

As a result of the change, at 420, the communications device determines that the backup communications link is preferred based on selection criteria such as those discussed above. For example, the communications device may determine, based on the selection criteria, that the backup communications link is preferred over the primary link. In some embodiments, at 420, the communications device determines that the backup communications link is preferred based on the occurrence of the change, such that selection criteria are not used.

At 430, the backup communications link is established between the communications device and another network node using the backup link. The backup communications link may be established using conventional techniques.

At 440, the communications device communicates with another device using a path including the backup link. In some embodiments, as a result of using the backup link, the communication path includes a network foreign to the communications device.

Figure 6:
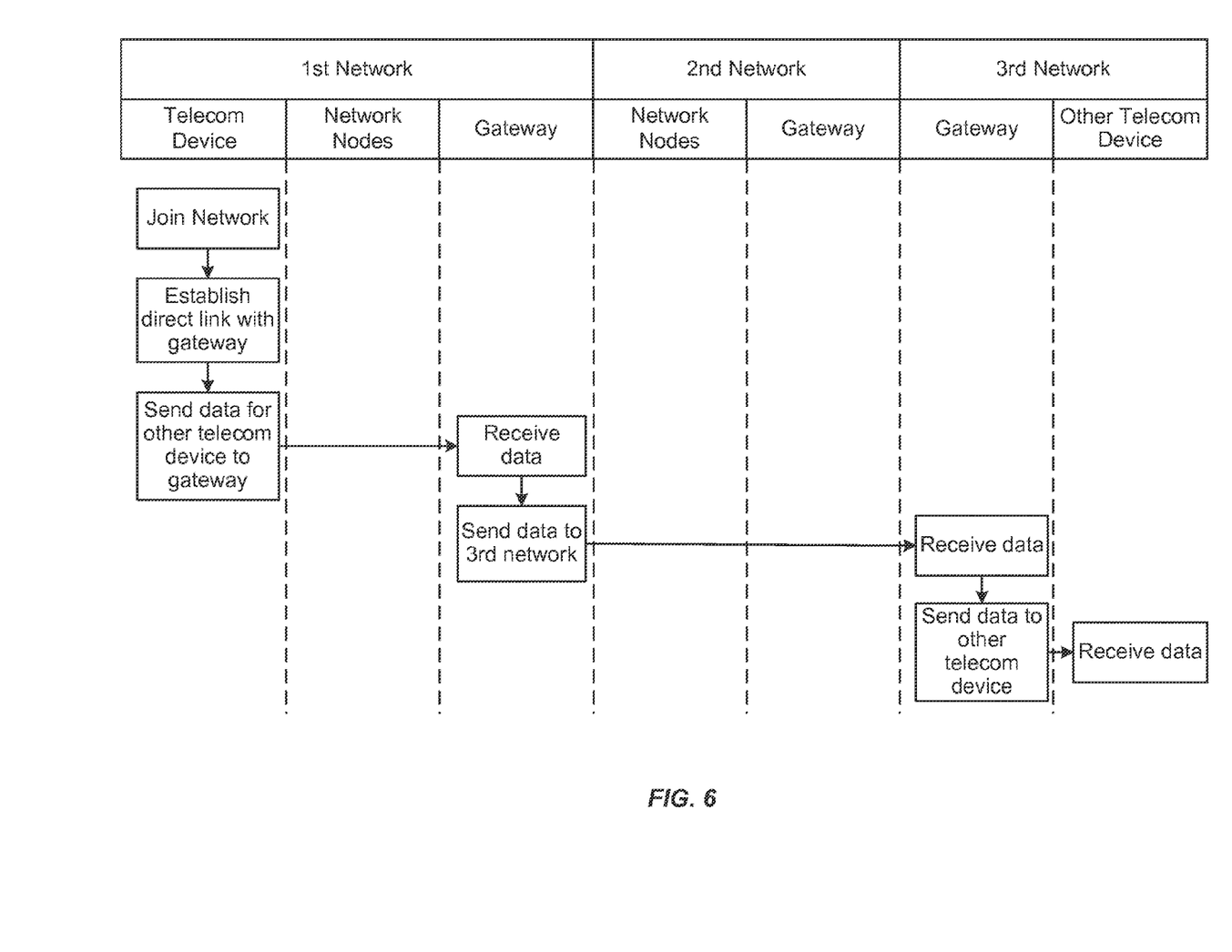
FIG. 6 is a swimming lane diagram of a method illustrating operation of a telecommunication system functioning according to some embodiments.

FIG. 6 is a swimming lane diagram of a method illustrating operation of a telecommunication system functioning according to some embodiments. In this example, the specified actors may be configured to perform the specified actions using systems and methods described elsewhere herein.

As shown, a telecommunications device, such as telecommunications device 100 of FIG. 2, joins a first network. The telecommunications device also establishes a direct communications link with the gateway of the first network. In addition, the telecommunications device sends data for another telecommunications device to the gateway.

The gateway receives the data from the telecommunications device, and transmits the data for the other telecommunications device to a third network. The gateway of the third network receives the data and transmits the data to the other telecommunications device, which receives the data originally sent by the telecommunications device in the first network.

Data may be similarly transmitted from the other telecommunications device in the third network to the telecommunications device in the first network along a corresponding path in the opposite direction. Alternatively, the other telecommunications device in the third network may transmit data to the telecommunications device in the first network using an alternative path.

Figure 7:
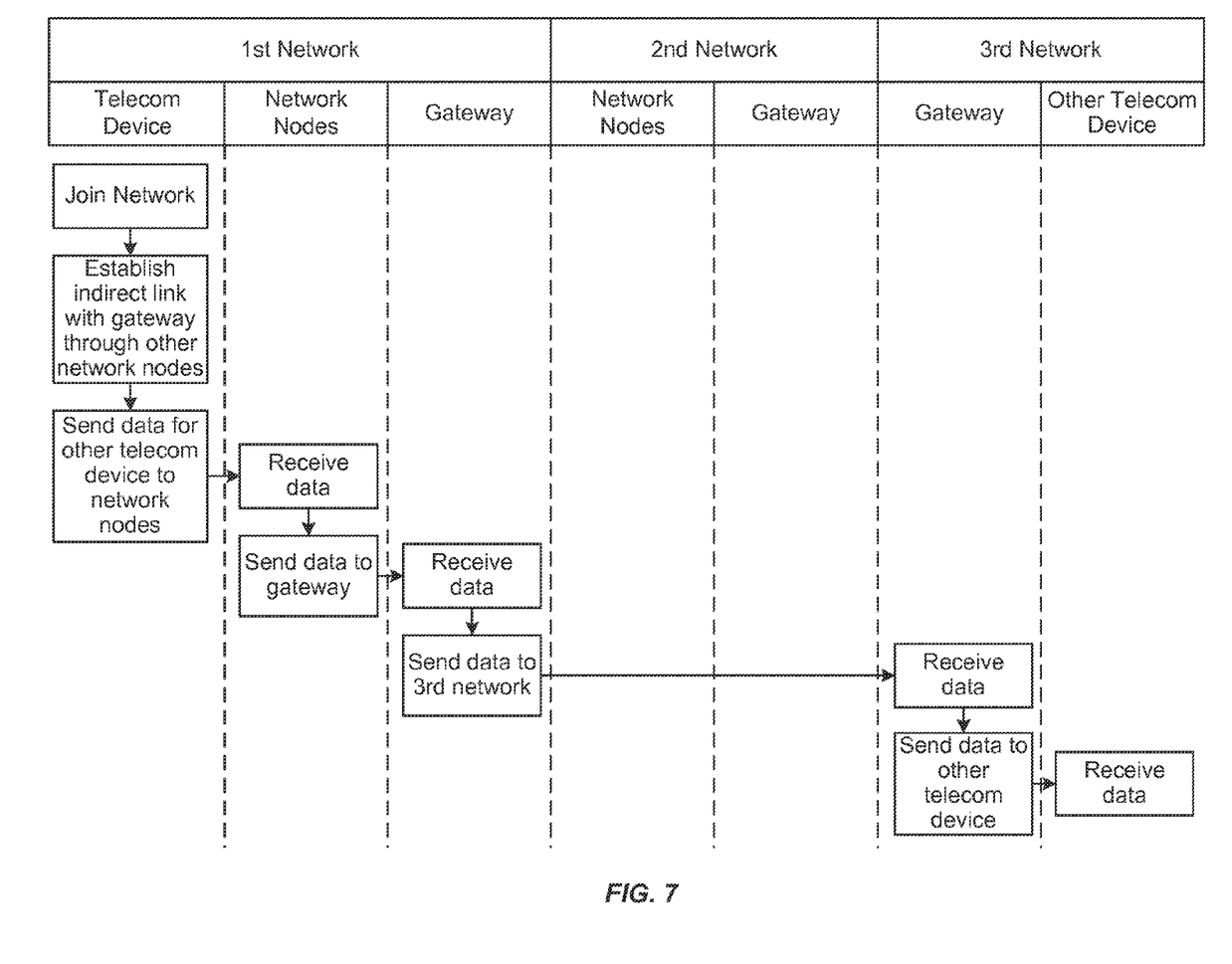
FIG. 7 is a swimming lane diagram of a method illustrating operation of a telecommunication system functioning according to some embodiments.

FIG. 7 is a swimming lane diagram of a method illustrating operation of a telecommunication system functioning according to some embodiments. In this example, the specified actors may be configured to perform the specified actions using systems and methods described elsewhere herein.

As shown, a telecommunications device, such as telecommunications device 100 of FIG. 2, joins a first network. The telecommunications device also establishes an indirect communications link with the gateway of the first network via one or more network nodes of the first network. The network nodes may be telecommunications devices, such as telecommunications device 100 of FIG. 2. The telecommunications device may establish the indirect communications link using, for example, systems and methods described elsewhere herein. The telecommunications device also sends data for another telecommunications device to the one or more network nodes.

The one or more network nodes receive the data sent by the telecommunications device, and send the data to the gateway of the first network using, for example, systems and methods described elsewhere herein.

The gateway receives the data from the network nodes, and transmits the data for the other telecommunications device to a third network. The gateway of the third network receives the data and transmits the data to the other telecommunications device, which receives the data originally sent by the telecommunications device in the first network.

Data may be similarly transmitted from the other telecommunications device in the third network to the telecommunications device in the first network along a corresponding path in the opposite direction. Alternatively, the other telecommunications device input third network may transmit data to the telecommunications device in the first network using an alternative path.

Figure 8:
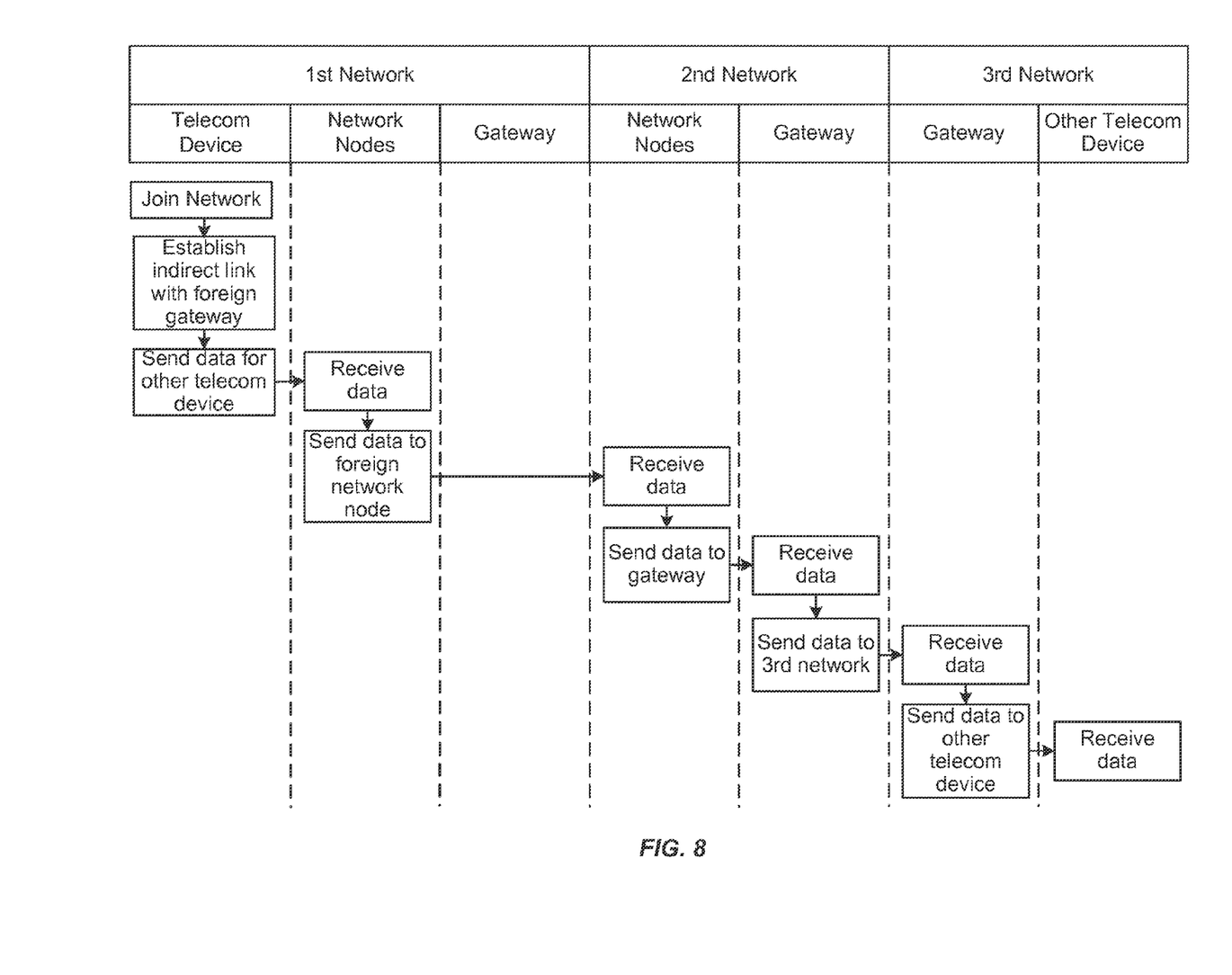
FIG. 8 is a swimming lane diagram of a method illustrating operation of a telecommunication system functioning according to some embodiments.

FIG. 8 is a swimming lane diagram of a method illustrating operation of a telecommunication system functioning according to some embodiments. In this example, the specified actors may be configured to perform the specified actions using systems and methods described elsewhere herein.

As shown, a telecommunications device, such as telecommunications device 100 of FIG. 2, joins a first network. The telecommunications device also establishes an indirect communications link with the gateway of a second network via one or more network nodes of the first network and one or more network nodes of the second network. The network nodes may be telecommunications devices, such as telecommunications device 100 of FIG. 2. The telecommunications device may establish the indirect communications link using, for example, systems and methods described elsewhere herein. The telecommunications device also sends data for another telecommunications device to the one or more network nodes of the first and second networks.

The one or more network nodes of the first and second networks receive the data sent by the telecommunications device, and send the data to the gateway of the second network using, for example, systems and methods described elsewhere herein.

The gateway of the second network receives the data from the network nodes of the first and second networks, and transmits the data for the other telecommunications device to a third network. The gateway of the third network receives the data and transmits the data to the other telecommunications device, which receives the data originally sent by the telecommunications device in the first network.

Data may be similarly transmitted from the other telecommunications device in the third network to the telecommunications device in the first network along a corresponding path in the opposite direction. Alternatively, the other telecommunications device in the third network may transmit data to the telecommunications device in the first network using an alternative path.

While various embodiments of present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A method of telecommunicating, comprising:
establishing a primary communications link to a first gateway in a first communications network;
determining that a backup communications link is to be established;
determining first and second candidate network nodes, wherein the first candidate network node is in the first communications network, wherein the second candidate network node is in a second communications network having a second gateway, and wherein the second communications network is different from the first communications network;
based on selection criteria, selecting the second candidate node over the first candidate node as a result of the second candidate node being in a network different from the first network;
establishing the backup communications link with the second candidate network node; and
communicating using the backup communications link.

2. The method of claim 1, wherein the selection criteria comprise mathematically weighted factors.

3. The method of claim 1, wherein determining that the backup communications link is to be established is performed automatically.

4. The method of claim 1, wherein determining that the backup communications link is to be established is performed in response to an instruction from a user.

5. The method of claim 1, wherein determining that the backup communications link is to be established is performed as part of a process of joining a network.

6. The method of claim 1, wherein determining that the backup communications link is to be established is performed as part of a process of establishing a primary communications link.

7. The method of claim 1, wherein determining that the backup communications link is to be established is performed in response to a change within a network.

8. The method of claim 1, wherein determining the candidate nodes comprises determining one or more neighboring nodes with which the backup communications link may be established.

9. The method of claim 1, wherein prior to selection of the second candidate node, costs associated with each candidate node are randomly or pseudo-randomly assigned, and the second candidate node is selected based at least in part on the costs of the candidate nodes.

10. The method of claim 1, wherein the second candidate node is selected based at least in part on a random or pseudo-random factor.

11. A telecommunications device, comprising:
an interface configured to communicatively couple with other telecommunications devices;
a memory, configured to store instructions; and
a processor, configured to execute the stored instructions so as to cause the telecommunications device to perform a method, comprising:
establishing a primary communications link to a first gateway in a first communications network;
determining that a backup communications link is to be established;
determining first and second candidate network nodes, wherein the first candidate network node is in the first communications network, wherein the second candidate network node is in a second communications network having a second gateway, and wherein the second communications network is different from the first communications network;
selecting the second candidate node over the first candidate node as a result of the second candidate node being in a network different from the first network;
establishing the backup communications link with the second candidate network node; and
communicating using the backup communications link.

12. The telecommunications device of claim 11, wherein the selection criteria comprise mathematically weighted factors.

13. The telecommunications device of claim 11, wherein determining that the backup communications link is to be established is performed automatically.

14. The telecommunications device of claim 11, wherein determining that the backup communications link is to be established is performed in response to an instruction from a user.

15. The telecommunications device of claim 11, wherein determining that the backup communications link is to be established is performed as part of a process of joining a network.

16. The telecommunications device of claim 11, wherein determining that the backup communications link is to be established is performed as part of a process of establishing a primary communications link.

17. The telecommunications device of claim 11, wherein determining that the backup communications link is to be established is performed in response to a change within a network.

18. The telecommunications device of claim 11, wherein determining the candidate nodes comprises determining one or more neighboring nodes with which the backup communications link may be established.

19. The telecommunications device of claim 11, wherein prior to selection of the second candidate node, costs associated with each candidate node are randomly or pseudo-randomly assigned, and the second candidate node is selected based at least in part on the costs of the candidate nodes.

20. The telecommunications device of claim 11, wherein the second candidate node is selected based at least in part on a random or pseudo-random factor.

* * * * *